US010816888B1

(12) United States Patent
Chen et al.

(10) Patent No.: US 10,816,888 B1
(45) Date of Patent: Oct. 27, 2020

(54) PROJECTOR, POWER CONTROL CIRCUIT AND METHOD FOR THE SAME

(71) Applicant: Qisda Corporation, Taoyuan (TW)

(72) Inventors: Chi-Jen Chen, Taoyuan County (TW); Fang-Chieh Lu, New Taipei (TW); Chun-Hsiao Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/830,442

(22) Filed: Mar. 26, 2020

(30) Foreign Application Priority Data

Apr. 9, 2019 (CN) .......................... 2019 1 0280949

(51) Int. Cl.
*G03B 21/20* (2006.01)
*H05B 45/12* (2020.01)
*H05B 45/22* (2020.01)
*H05B 41/02* (2006.01)
H05B 33/08 (2020.01)

(52) U.S. Cl.
CPC ....... *G03B 21/206* (2013.01); *G03B 21/2033* (2013.01); *H05B 41/02* (2013.01); *H05B 45/12* (2020.01); *H05B 45/22* (2020.01); H05B 33/08 (2013.01)

(58) Field of Classification Search
CPC .. G03B 21/206; G03B 21/2033; H05B 41/02; H05B 33/08; H05B 45/22; H05B 45/12
See application file for complete search history.

(56) References Cited

U.S. PATENT DOCUMENTS

| 5,694,008 | A | * | 12/1997 | Hak | ..................... | H05B 41/382 |
| | | | | | | 315/289 |
| 7,894,215 | B2 | * | 2/2011 | Chen | ...................... | H02M 1/12 |
| | | | | | | 363/21.12 |
| 8,766,551 | B2 | * | 7/2014 | Terashima | ......... | G03B 21/2026 |
| | | | | | | 315/287 |
| 8,911,095 | B2 | * | 12/2014 | Kimura | ................ | H04N 13/341 |
| | | | | | | 353/85 |
| 9,084,306 | B1 | * | 7/2015 | Bohler | ................... | H05B 47/10 |
| 9,686,012 | B2 | * | 6/2017 | Inoue | ................... | H05B 47/185 |
| 2004/0120163 | A1 | * | 6/2004 | Nakagawa | ........ | H02M 3/33523 |
| | | | | | | 363/20 |
| 2009/0167212 | A1 | * | 7/2009 | Wang | ................... | H05B 41/285 |
| | | | | | | 315/308 |

(Continued)

OTHER PUBLICATIONS

Bristolwatch, http://www.bristolwatch.com/ele2/zero_crossing. htm; date available online: Feb. 13, 2018 (Year: 2018) (Year: 2018).*

*Primary Examiner* — Borna Alaeddini

(57) ABSTRACT

A power control circuit for a projector for controlling a light source of the projector. The power control circuit includes: a detector for detecting an AC input voltage is a first value or a second value; a switch coupled to the detector, conducting or disconnecting of the switch being based on the detector detecting whether the AC input voltage is the first value or the second value, the switch further outputting a first control signal; and a laser driver coupled to the switch and the light source, in response the first control signal from the switch to change power consumption of the light source. When the AC input voltage is the first value, power consumption of the light source is a default value. When the AC input voltage is the second value, power consumption of the light source decreased from the default value.

8 Claims, 3 Drawing Sheets

(56) References Cited

U.S. PATENT DOCUMENTS

| | | | | |
|---|---|---|---|---|
| 2012/0262080 A1* | 10/2012 | Watanabe | ............ | H05B 45/10 |
| | | | | 315/210 |
| 2012/0299500 A1* | 11/2012 | Sadwick | ............... | H05B 45/50 |
| | | | | 315/224 |
| 2020/0008278 A1* | 1/2020 | Bouchard | ............ | H05B 39/048 |

* cited by examiner

US 10,816,888 B1

PROJECTOR, POWER CONTROL CIRCUIT AND METHOD FOR THE SAME

This application claims the benefit of People's Republic of China application Serial No. 201910280949.4, filed Apr. 9, 2019, the subject matter of which is incorporated herein by reference.

BACKGROUND OF THE INVENTION

Field of the Invention

The invention relates in general to a projector, a power control circuit and method for the same.

Description of the Related Art

Projector can be used in the meeting at office or home entertainment, and has gradually become an indispensable electronic product in people's everyday life.

As the brightness of the projector increases, the power of the projector also needs to increase. If the projector is powered by an AC current of 110V, the overall current consumption of the projector can be over 15 A, which exceeds the safety standard of the socket. Therefore, when the projector is powered by an AC current of 110V, the current and voltage of the projector need to be restricted automatically to comply with the safety standard.

SUMMARY OF THE INVENTION

According to an embodiment of the present invention, a power control circuit for a projector for controlling a light source of the projector is provided. The power control circuit includes: a detector for detecting whether an AC input voltage is a first value or a second value; a switch coupled to the detector for outputting a first control signal, wherein the conducting or disconnecting of the switch relates to whether the AC input voltage detected by the detector is the first value or the second value; and a laser driver coupled to the switch and the light source for changing the power of the light source in response to the first control signal outputted by the switch. When the AC input voltage is the first value, the power of the light source is a default value. When the AC input voltage is the second value, the power of the light source is decreased from the default value.

According to another embodiment of the present invention, provided is a projector including: a light source; and a power control circuit coupled to the light source, for controlling the light source. The power control circuit comprises: a detector for detecting whether an AC input voltage is a first value or a second value; a switch coupled to the detector for outputting a first control signal, wherein conducting or disconnecting of the switch is based on whether the AC input voltage detected by the detector is the first value or the second value; and a laser driver coupled to the switch and the light source for changing power of the light source in response to the first control signal outputted by the switch. When the AC input voltage is the first value, the power of the light source is a default value; and when the AC input voltage is the second value, the power of the light source is decreased from the default value.

According to yet another embodiment of the present invention, provided is a power control method for a projector having a switch and a light source, the power control method including: detecting whether an AC input voltage is a first value or a second value; outputting a first control signal from the switch, wherein conducting or disconnecting of the switch is based on whether the AC input voltage is the first value or the second value; and changing power of the light source in response to the first control signal outputted by the switch, wherein, when the AC input voltage is the first value, the power of the light source is a default value; and when the AC input voltage is the second value, the power of the light source is decreased from the default value.

The above and other aspects of the invention will become better understood with regards to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
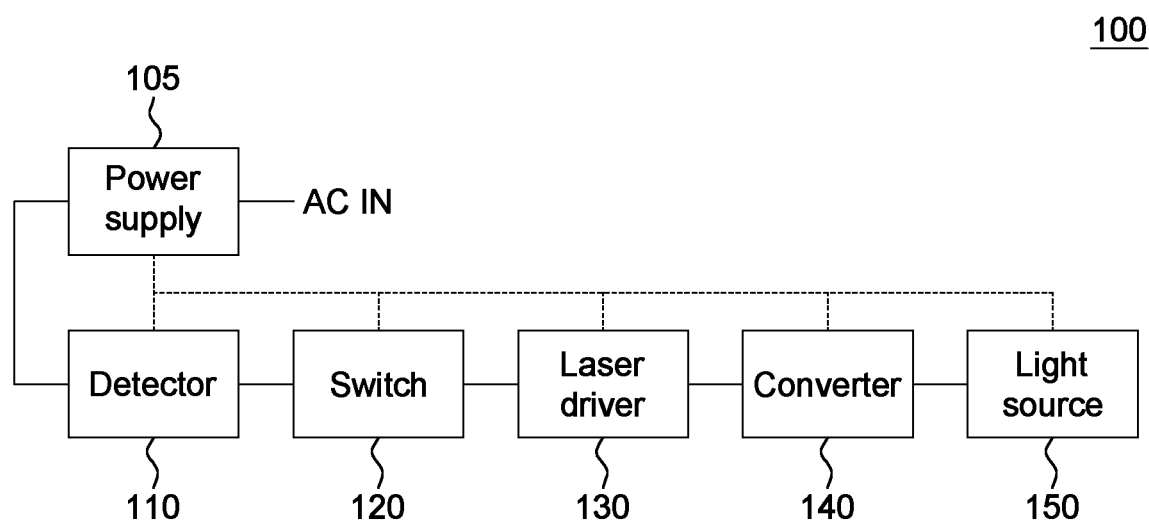
FIG. 1 is a functional block diagram of a projector according to an exemplary embodiment of the invention.

FIG. 1 is a functional block diagram of a projector according to an exemplary embodiment of the invention. As indicated in FIG. 1, the projector 100 includes: a power supply 105, a detector 110, a switch 120, a laser driver 130, a converter 140 and a light source 150. The detector 110, the switch 120 and the laser driver 130 can also be referred as a power detection circuit.

The power supply 105 receives an AC input voltage AC IN for outputting to the detector 110.

The detector 110, coupled to the power supply 105, detects whether the AC input voltage AC IN is 110V or 220V according to the output voltage of the power supply 105. When the AC input voltage AC IN is 110V, the detector 110 controls the switch 120 to be conducted, and restricts the current of the projector 100. When the AC input voltage AC IN is 220V, the detector 110 controls the switch 120 to be disconnected, and lifts the restriction of the current of the projector 100. That is, in the default mode, the projector 100 is operated at a voltage below 220V.

The switch 120, coupled to the detector 110, is conducted or disconnected according to the control signal of the detector 110.

The laser driver 130, coupled to the switch 120, outputs different control signals to the converter 140 according to whether the switch 120 is disconnected (when the AC input voltage AC IN is 220V) or conducted (when the AC input voltage AC IN is 110V).

The converter 140, coupled to the laser driver 130, is operated according to the control signal of the laser driver 130, and changes the current provided to the light source 150 to control the overall power of the projector 100. The power supply 105 also provides basic electricity to the internal units 110-150 of the projector 100, wherein the basic electricity is represented by dotted lines in FIG. 1.

Figure 2:
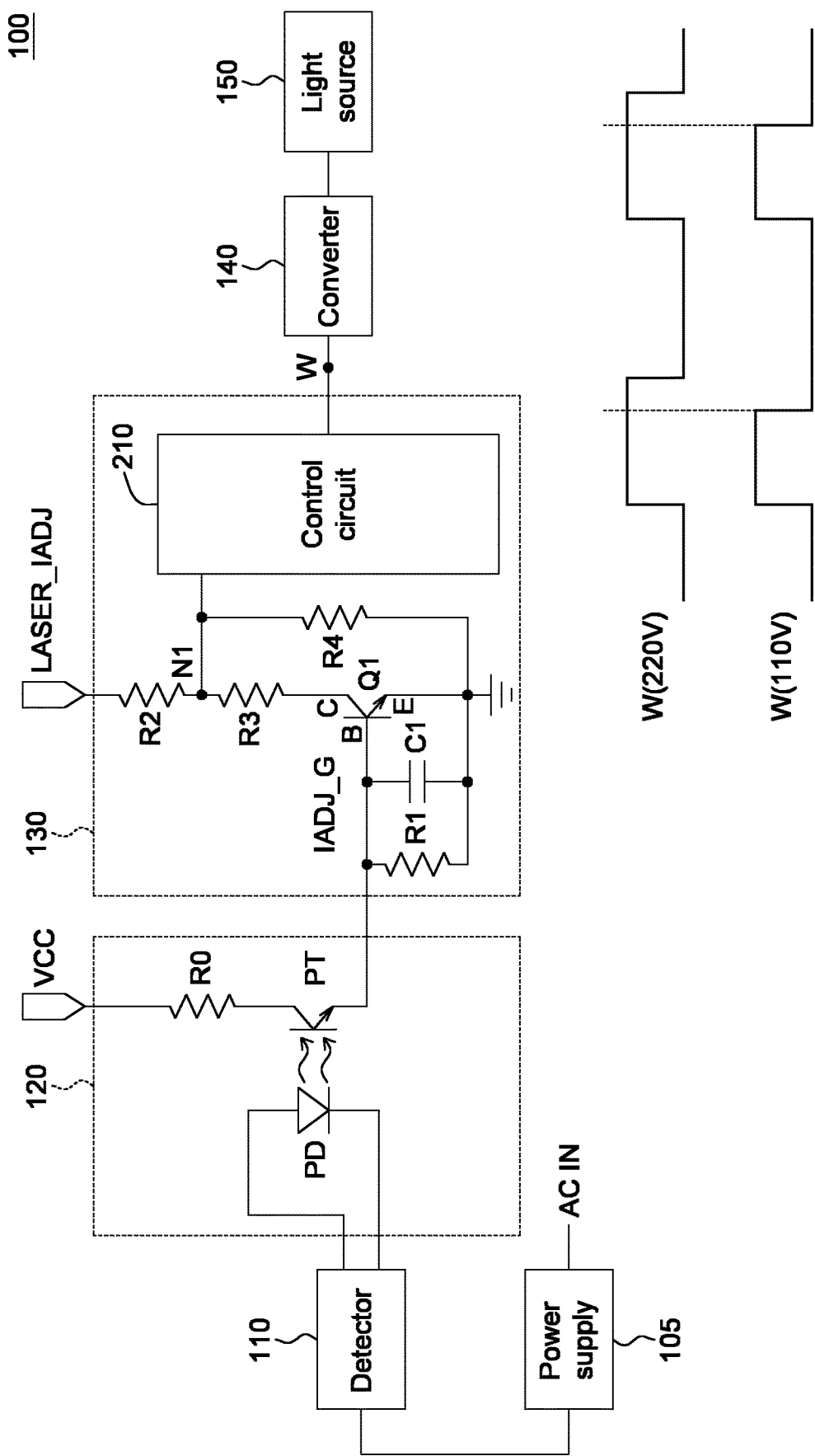
FIG. 2 is a partial detailed structure of a projector according to an exemplary embodiment of the invention.

FIG. 2 is a partial detailed structure of a projector according to an exemplary embodiment of the invention. As indicated in FIG. 2, the switch 120 includes a photo-diode PD, a photo-transistor PT and a resistor R0. The two ends of photo-diode PD are coupled to different pins of the detector 110, wherein, at least one of the two ends of the photo-diode PD is coupled to a control pin of the detector 110 and conducting or disconnecting of the photo-diode PD is based on the result of the AC input voltage AC IN detected by the detector 110. For example, when the detector 110 detects that the AC input voltage AC IN is 220V, the photo-diode PD is disconnected (that is, not luminescent) in response to the control signal (not illustrated) outputted by the detector 110. When the detector 110 detects that the AC input voltage AC IN is 110V, the photo-diode PD is conducted (that is, luminescent) in response to the control signal (not illustrated) outputted by the detector 110.

The photo-transistor PT is disposed adjacent to the photo-diode PD. One end (such as the drain) of the photo-transistor PT outputs a control signal IADJ_G to the laser driver 130, and the other end (such as the source) of the photo-transistor PT is connected to the resistor R0. The resistor R0 is interposed between one end (such as the source) of the photo-transistor PT and the operating voltage VCC. In an exemplary embodiment of the present disclosure, the operating voltage VCC is such as 3.3V, 5V or 12V.

In response to the photo-diode PD being illuminating, the photo-transistor PT is conducted. In response to the photo-diode PD not being illuminating, the photo-transistor PT is disconnected.

Furthermore, when the detector 110 detects that the AC input voltage AC IN is 220V, the photo-diode PD is disconnected; when the detector 110 detects that the AC input voltage AC IN is 110V, the photo-diode PD is conducted and illuminating and makes the photo-transistor PT be conducted.

The laser driver 130 includes: a control circuit 210, a BJT transistor Q1, a resistor R1-R4, and a capacitor C1. The resistor R1 and the capacitor C1 are coupled between one end (such as the drain) of the photo-transistor PT and the ground. The base of the BJT transistor Q1 receives the control signal IADJ_G from one end (such as the drain) of the photo-transistor PT; the emitter of the BJT transistor Q1 is grounded; the collector of the BJT transistor Q1 is connected to the resistor R3.

The resistor R2 is interposed between the control signal LASER_IADJ and the node N1, wherein, the control signal LASER_IADJ is outputted by the motherboard (not illustrated) and can be used to linearly control the current of the light source 150. The resistor R3 is interposed between the node N1 and the collector of the BJT transistor Q1. The resistor R4 is interposed between the node N1 and the ground.

In an illustrative sense rather than a restrictive sense, the control signal LASER_IADJ is in a range of 0.3V-3V. The control signal LASER_IADJ and the power consumption of the light source 150 form a linear relationship (to be more accurately, the voltage at the node N1 and the power consumption of the light source 150 form a linear relationship, wherein, the voltage at the node N1 relates to the value of the control signal LASER_IADJ and whether the AC input voltage AC IN is 220V). Here, the AC input voltage AC IN is exemplified by 220V (the default value). When the control signal LASER_IADJ is 0.3V, the power consumption of the light source 150 can be 100 W. When the control signal LASER_IADJ is 1.5V, the power consumption of the light source 150 can be 500 W. When the control signal LASER_IADJ is 3V, the power consumption of the light source 150 can be 1000 W.

Details for controlling the power of the projector 100 are disclosed below. For the convenience of explanation, the resistors R2, R3 and R4 are respectively exemplified by 22K, 12K and 12K. However, the present disclosure is not limited thereto. Here, the resistors R2, R3 and R4 together can be referred as a voltage divider.

When the detector 110 detects that the AC input voltage AC IN is 220V, the photo-diode PD is disconnected and the photo-transistor PT is disconnected. That is, the control signal IADJ_G is at logic high. Since the control signal IADJ_G is at logic high, the BJT transistor Q1 is disconnected. Based on the voltage division by the resistor R2 and R4, the electric potential at the node N1 can be expressed as: LASER_IADJ*R4/(R2+R4)=LASER_IADJ*12K/(22K+12K)=0.35*LASER_IADJ.

Conversely, when the detector 110 detects that the AC input voltage AC IN is 110V, the photo-diode PD is conducted and the photo-transistor PT is conducted. That is, the control signal IADJ_G is at logic low. Since the control signal IADJ_G is at logic low, the BJT transistor Q1 is conducted. Based on the voltage division by the resistors R2, R3 and R4, the electric potential at the node N1 can be expressed as: LASER_IADJ*R4/(R2+R4||R3)= LASER_IADJ*12K/(22K+12K||12K)= LASER_IADJ*12K/(22K+6K)=0.21*LASER_IADJ.

It can be known from the above disclosure that the voltage at the node N1 when the AC input voltage AC IN is 110V is about 60% (0.21/0.35=60%) of the voltage at the node N1 when the AC input voltage AC IN is 220V.

Since the control circuit 210 detects that the electric potential at the node N1 changes, the control signal W outputted to the converter 140 by the control circuit 210 also changes, and further changes the power of the light source 150.

As disclosed above, when the control signal LASER_IADJ is 3V, the power of the light source 150 is about 1000 W (default value, that is, when the AC input voltage AC IN is 220V). When the AC input voltage AC IN is 110, the power of the light source 150 is about 600 W despite that the control signal VLASER_IADJ is still 3V.

FIG. 2 also illustrates the control signal W outputted to the converter 140 by the control circuit 210. When the AC input voltage AC IN is 220V, the conduction ratio of W(220V) is 100%. When the AC input voltage AC IN is 220V, the conduction ratio of W(110V) will decrease (to about 60% in the above example).

According to the embodiments of the present disclosure, whether the AC input voltage AC IN is 220V or 110V can be automatically detected. When it is detected that the AC input voltage AC IN is 110V, the power control circuit of the embodiments of the present disclosure can automatically restrict the current and power consumption of the light source 150 to comply with the safety regulations.

Besides, the switch 120 also provides electric isolation. For example, the power supply 105 and the detector 10 belong to a high voltage field (110V/220V), but the laser driver 130, the converter 140 and the light source 150 belong to a low voltage field (3.3V). The high voltage field and the low voltage field are electrically isolated by the switch 120 (that is, the ground at the high voltage field will not be coupled to the ground at the low voltage field).

Figure 3:
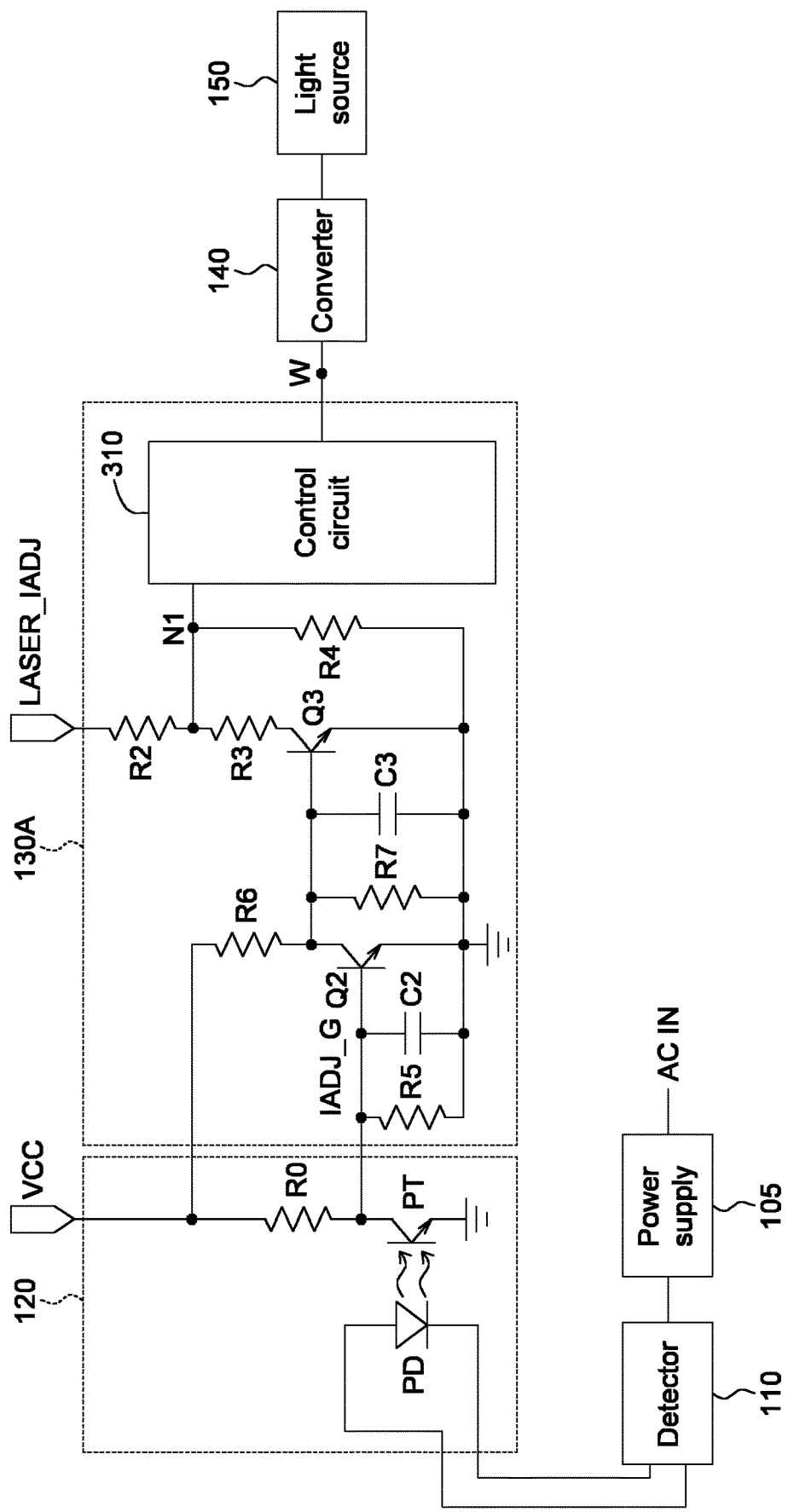
FIG. 3 is a partial detailed structure of a projector according to another exemplary embodiment of the invention.

Referring to FIG. 3, a partial detailed structure of a projector 100A according to another exemplary embodiment of the invention is shown. As indicated in FIG. 3, the laser driver 130A includes: a control circuit 310, BJT transistors Q2-Q3, resistors R2-R7, and capacitors C2-C3. The resistor R5 and the capacitor C2 are coupled between one end (such as the drain) of the photo-transistor PT and the ground. The base of the BJT transistor Q2 receives the control signal IADJ_G from one end (such as the drain) of the photo-transistor PT; the emitter of the BJT transistor Q2 is grounded; the collector of the BJT transistor Q2 is connected to the resistor R6. The resistor R6 is interposed between the collector of the BJT transistor Q2 and the operating voltage VCC. The collector of the BJT transistor Q2 is further connected to the base of the BJT transistor Q3.

The resistor R7 and the capacitor C3 are coupled between the base of the BJT transistor Q3 and the ground. The base of the BJT transistor Q3 is connected to the collector of the BJT transistor Q2; the emitter of the BJT transistor Q3 is grounded; the collector of the BJT transistor Q3 is connected to the resistor R3.

The resistor R3 is interposed between the node N1 and the collector of the BJT transistor Q3. The resistor R4 is interposed between the node N1 and the ground.

When the detector 110 detects that the AC input voltage AC IN is 220V, the photo-diode PD is disconnected and the photo-transistor PT is disconnected. That is, the control signal IADJ_G is at logic high. Since the control signal IADJ_G is at logic high, the BJT transistor Q2 is conducted, the base voltage of the BJT transistor Q3 is pulled down, and the BJT transistor Q3 is disconnected. Based on the voltage division by the resistors R2 and R4, the electric potential at the node N1 can be expressed as: LASER_IADJ*R4/(R2+R4)=LASER_IADJ*12K/(22K+12K)=0.35*LASER_IADJ.

Conversely, when the detector 110 detects that the AC input voltage AC IN is 110V, the photo-diode PD is conducted and the photo-transistor PT is conducted. That is, the control signal IADJ_G is at logic low. Since the control signal IADJ_G is at logic low, the BJT transistor Q2 is disconnected. Through the design of the relationship between the resistance of the resistor R6 and the resistance of the resistor R7 (for example, the resistance of the resistor R6 is about 1/10 of the resistance of the resistor R7), the base voltage of the BJT transistor Q3 is boosted and makes the BJT transistor Q3 be conducted.

Based on the voltage division by the resistors R2, R3 and R4, the electric potential at the node N1 can be expressed as: LASER_IADJ*R4/(R2+R4||R3)=LASER_IADJ*12K/(22K+12K||12K)=LASER_IADJ*12K/(22K+6K)=0.21*LASER_IADJ.

As disclosed above, FIG. 3 can achieve similar function like FIG. 2, that is, whether the AC input voltage AC IN is 220V or 110V can be automatically detected. When it is detected that the AC input voltage AC IN is 110V, the power control circuit of the embodiments of the present disclosure can automatically restrict the current and power consumption of the light source 150 to comply with the safety regulations.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power control circuit of a projector for controlling a light source of the projector, the power control circuit comprising:
   a detector for detecting whether an AC input voltage is a first value or a second value;
   a switch coupled to the detector, wherein conducting or disconnecting of the switch is based on whether the AC input voltage detected by the detector is the first value or the second value, and the switch outputs a first control signal; and
   a laser driver coupled to the switch and the light source for changing power of the light source in response to the first control signal outputted by the switch, wherein, when the AC input voltage is the first value, the power of the light source is a default value; and when the AC input voltage is the second value, the power of the light source is decreased from the default value;
   wherein, the switch comprises:
      a photo-diode coupled to the detector; and
      a photo-transistor disposed adjacent to the photo-diode, wherein, when the detector detects that the AC input voltage is the first value, the photo-diode is disconnected; and
      when the detector detects that the AC input voltage is the second value, the photo-diode is conducted and emits a light and makes the photo-transistor be conducted;
   wherein, the laser driver further comprises:
      a first transistor coupled to the photo-transistor;
      a voltage divider coupled to the first transistor for dividing a second control signal to generate a node voltage; and
      a control circuit coupled to the voltage divider for detecting the node voltage to change the power of the light source, wherein, when the AC input voltage is the second value, in response to the photo-transistor being conducted, the first transistor is conducted and makes the node voltage become a first node voltage; and
   wherein, when the AC input voltage is the first value, in response to the photo-transistor being disconnected, the first transistor is disconnected and makes the node voltage become a second node voltage, and the first node voltage is lower than the second node voltage.

2. The power control circuit according to claim 1, wherein, the first value is 220V, and the second value is 110V.

3. The power control circuit according to claim 1, wherein, the detector belongs to a high voltage field, the laser driver and the light source belong to a low voltage field, and the switch electrically isolates the high voltage field and the low voltage field.

4. The power control circuit according to claim 1, wherein, the second control signal and the power of the light source form a linear relationship; and the voltage at the node and the power of the light source form another linear relationship.

5. A projector comprising:
   a light source; and
   a power control circuit coupled to the light source, for controlling the light source,
   the power control circuit comprising:
      a detector for detecting whether an AC input voltage is a first value or a second value;
      a switch coupled to the detector, wherein conducting or disconnecting of the switch is based on whether the AC input voltage detected by the detector is the first value or the second value, and the switch outputs a first control signal; and a laser driver coupled to the switch and the light source for changing power of the light source in response to the first control signal outputted by the switch, wherein when the AC input voltage is the first value, the power of the light source is a default value; and when the AC input voltage is the second value, the power of the light source is decreased from the default value; wherein, the switch comprises:

a photo-diode coupled to the detector; and a photo-transistor disposed adjacent to the photo-diode, wherein when the detector detects that the AC input voltage is the first value, the photo-diode is disconnected; and when the detector detects that the AC input voltage is the second value, the photo-diode is conducted and emits a light and makes the photo-transistor be conducted;

wherein, the laser driver further comprising:

a first transistor coupled to the photo-transistor;

a voltage divider coupled to the first transistor for dividing a second control signal to generate a node voltage; and a control circuit coupled to the voltage divider for detecting the node voltage to change the power of the light source, wherein, when the AC input voltage is the second value, in response to the photo-transistor being conducted, the first transistor is conducted and makes the node voltage become a first node voltage; and wherein, when the AC input voltage is the first value, in response to the photo-transistor being disconnected, the first transistor is disconnected and makes the node voltage become a second node voltage, and the first node voltage is lower than the second node voltage.

6. The projector according to claim 5, wherein, the first value is 220V, and the second value is 110V.

7. The projector according to claim 5, wherein, the detector belongs to a high voltage field, the laser driver and the light source belong to a low voltage field, and the switch electrically isolates the high voltage field and the low voltage field.

8. The projector according to claim 5, wherein, the second control signal and the power of the light source form a linear relationship; and the voltage at the node and the power of the light source form another linear relationship.

* * * * *